(12) United States Patent
Martin et al.

(10) Patent No.: US 6,629,808 B1
(45) Date of Patent: Oct. 7, 2003

(54) EXPANDABLE MOUNTING PIN ARRANGEMENT

(75) Inventors: Kevin L. Martin, Peoria, IL (US); Timothy J. Weirich, Edelstein, IL (US); Jose Mauricio Tuschi, Sao Paulo (BR)

(73) Assignee: Caterpillar Inc, Peoria, IL (US)

( * ) Notice: Subject to any disclaimer, the term of this patent is extended or adjusted under 35 U.S.C. 154(b) by 327 days.

(21) Appl. No.: 09/885,261

(22) Filed: Oct. 31, 2000

(51) Int. Cl.[7] ................................. F16B 13/04
(52) U.S. Cl. .................. 411/24; 411/34; 411/369; 411/900; 403/370
(58) Field of Search ................. 411/24, 26, 27, 411/80.5, 57.1, 58, 369, 542, 900, 907, 351; 403/367–370

(56) References Cited

U.S. PATENT DOCUMENTS

| | | | |
|---|---|---|---|
| 508,254 A | * 11/1893 | Steward | 411/26 |
| 1,120,367 A | 12/1914 | Booraem | |
| 1,349,437 A | * 8/1920 | Royer | 411/24 |
| 1,953,636 A | * 4/1934 | Skelton | 16/30 |
| 1,957,533 A | 5/1934 | Gelpcke | |
| 2,513,193 A | 6/1950 | Miller | |
| 2,525,198 A | * 10/1950 | Beijl | 411/26 |
| 2,542,967 A | 2/1951 | Waechter | |
| 2,612,376 A | 9/1952 | Wollner | |
| 3,974,734 A | 8/1976 | Machtle | |
| 4,020,735 A | 5/1977 | Herback | |
| 4,078,471 A | * 3/1978 | Archibald et al. | 411/15 |
| 4,322,194 A | * 3/1982 | Einhorn | 411/30 |
| 4,840,522 A | * 6/1989 | Kurihara | 411/44 |
| 4,978,264 A | 12/1990 | Philippe | |
| 5,106,225 A | 4/1992 | Andre et al. | |
| 5,263,802 A | * 11/1993 | Fichot et al. | 411/26 |
| 5,816,759 A | 10/1998 | Ernst et al. | |
| 6,048,149 A | 4/2000 | Garcia | |
| 6,416,267 B1 | * 7/2002 | Nehl | 411/80.5 |

\* cited by examiner

*Primary Examiner*—Flemming Saether
*Assistant Examiner*—Jori R. Schiffman
(74) *Attorney, Agent, or Firm*—Calvin E Glastetter; Jeff A Greene

(57) ABSTRACT

Mounting pin arrangements are useful for connecting a first and a second structure together. When the pin is inserted in a mounting structure the mounting pin arrangement needs to expand to seal the arrangement to prevent dust and dirt from entering the mounting arrangement. The subject mounting pin arrangement includes a sleeve assembly that has a plurality of sleeve segments and an elastomeric is positioned and connected to adjacent segments and includes an end cap on the end portion of the sleeve. The sleeve includes a tapered bore therethrough. A pair of inserts are positioned in the bore and include tapers that interact with the taper in the bore of the sleeve to expand the sleeve to seal the mounting arrangement. The arrangement of components provides an expandable pin arrangement that will prevent dust or dirt from entering the mounting arrangement to prolong the life of the various components.

12 Claims, 3 Drawing Sheets

EXPANDABLE MOUNTING PIN ARRANGEMENT

TECHNICAL FIELD

This invention relates generally to a mounting pin and more particularly to a mounting pin arrangement which is expandable to prevent dirt from entering the mounting cavity.

BACKGROUND ART

Pins are commonly used to mount one structure to a housing or structure. In order for the pins to be used in a cavity of the mounting structure the pin needs to be smaller in diameter than the diameter of the holes in the structure. When pins are used on earth working machines dust and dirt from the machine and the ground tend to enter the mounting structure and get packed into the mounting structure. Dirt packed in the mounting arrangement could damage the pins and the structure.

The present invention is directed to overcoming one or more of the problems as set forth above.

DISCLOSURE OF THE INVENTION

In one aspect of the present invention a mounting pin arrangement is adapted for attaching a first structure and a second structure together. The mounting pin arrangement includes a sleeve positionable within the first and second structure. The sleeve has a first end portion, a second end portion and a bore extending therethrough. The sleeve includes a plurality of adjacent sleeve segments having elastomeric material positioned and connected between the adjacent segments and an elastomeric end cap on the first end portion. A first insert is positionable within the bore of the first end portion of the sleeve. The first insert has a bore extending axially therethrough. A second insert is positionable within the bore of the second end portion of the sleeve. The second insert has a bore extending axially therethrough. A fastener is positionable within the bores of the first and second inserts to move the inserts axially toward each other within the bore of the sleeve assembly to expand the diameter of the circular sleeve assembly.

The present invention provides a mounting pin arrangement that has adjacent segments which have elastomeric material therebetween that is molded or bonded to the adjacent segments but will stretch the elastomeric material to allow expansion outwardly to fill the mounting cavity and also includes an end cap to seal between the sleeve assembly and the mounting structure. The arrangement will prevent dirt or other foreign matter from entering the mounting arrangement.

BEST MODE FOR CARRYING OUT THE INVENTION

Figure 1:
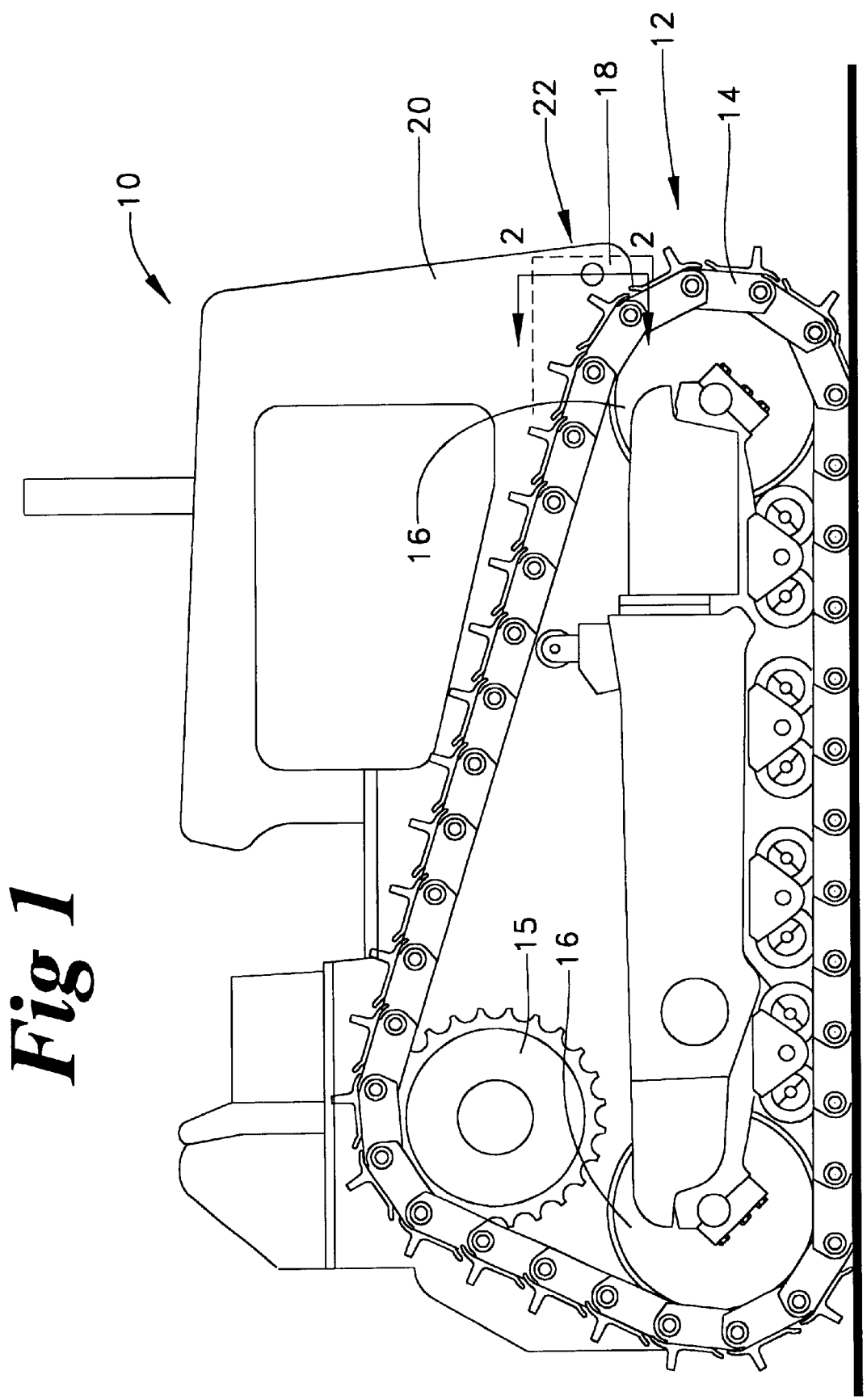
FIG. 1 is a diagrammatic side view of a track-type machine disclosing the present invention.

Referring to the drawings, and in particular FIG. 1 illustrates a track-type machine 10 having a pair of endless track assemblies 12, one of which is shown, mounted on respective sides of the machine 10. Each track assembly has an endless track 14 entrained about a drive sprocket 15 at the rearward end of the machine 10, and about a pair idler 16 at the forward and rear ends. The machine 10 further includes a first structure such as a main frame 18, and a second structure such as an engine enclosure 20. The first and second structures 18,20 are connected together by a mounting arrangement 22 embodying the present invention.

Figure 2:
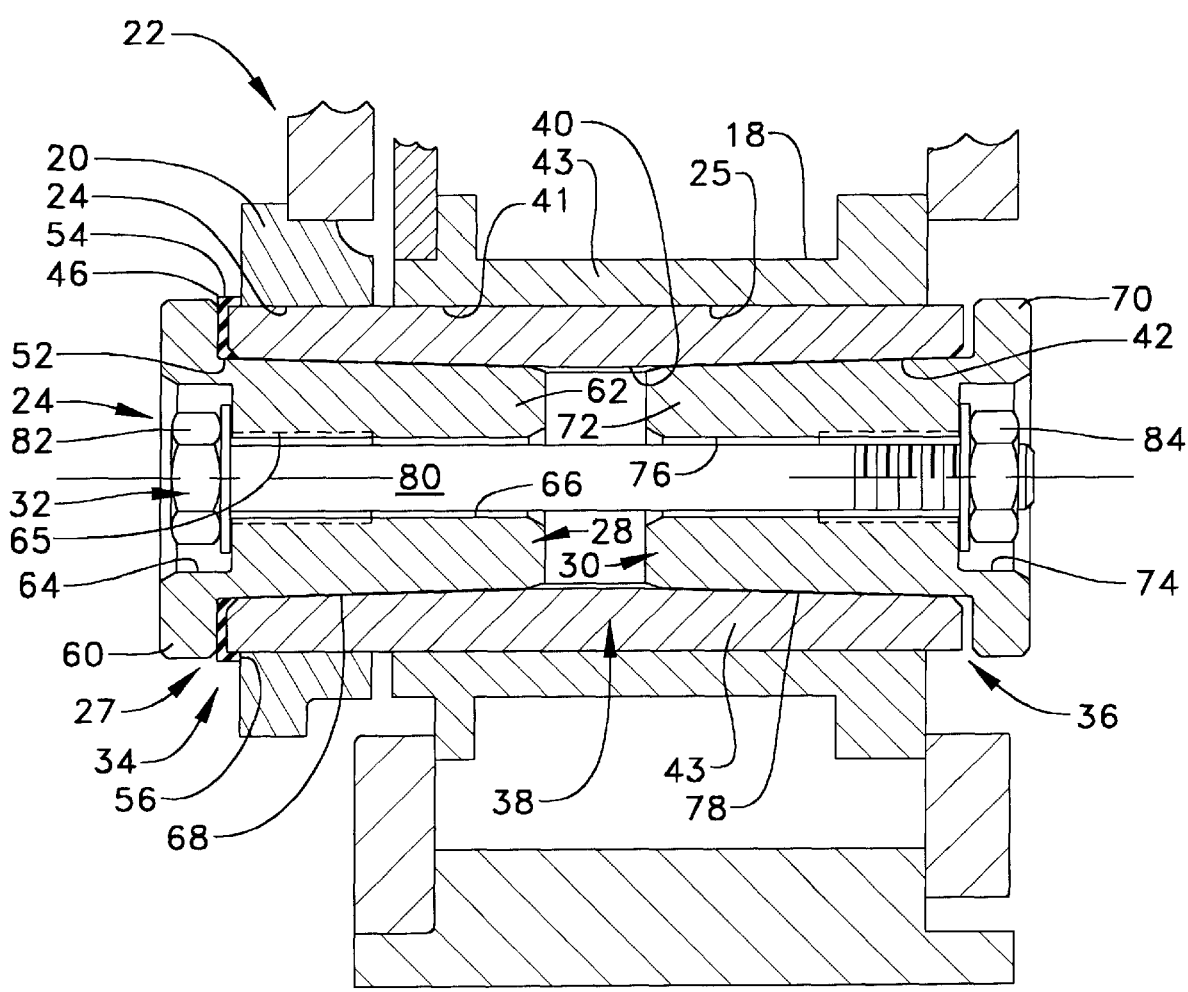
FIG. 2 is a sectional view of the present invention taken along line 2—2 in FIG. 1.
Figure 3:
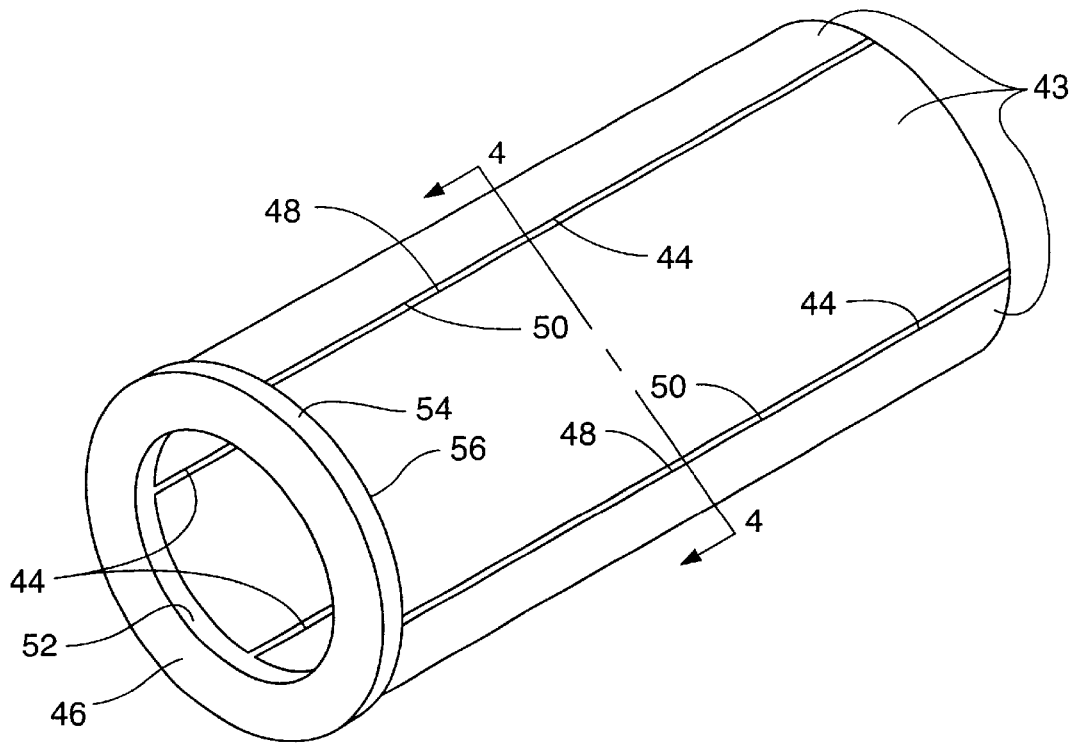
FIG. 3 is an isometric view of a portion of the present invention.
Figure 4:
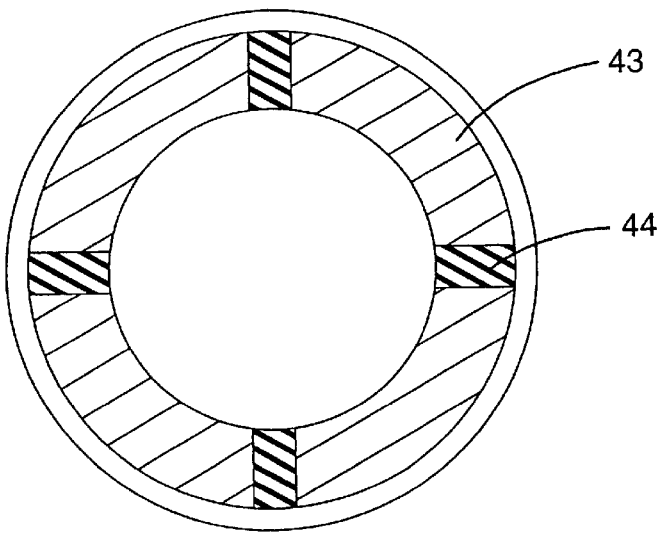
FIG. 4 is a sectional view of the sleeve taken along line 4—4 of FIG. 3.

Referring to FIGS. 2 and 4, the mounting arrangement 22 includes a sleeve assembly 24 positioned within a cavity 25 of the first structure 18 and a cavity 26 of the second structure 20 to releasable connect the structures together. The sleeve assembly 24 includes a circular shaped sleeve 27, a first insert 28, a second insert 30, and a fastener 32. The sleeve 27 has a first end portion 34, a second end portion 36, a middle portion 38, and a bore 40 extending axially therethrough. The bore 40 in the first end portion 34 has a tapered surface 41 which tapers from the end toward the middle. The bore 40 having the larger taper diameter at the end. The bore 40 in the second end portion 36 has a tapered surface 42 which tapers from the end toward the middle. The bore 40 having the larger taper diameter at the end. The circular sleeve assembly 24 is formed by a plurality of arcuate sleeve segments 43 formed and bonded together by an elastomeric material 44 which also forms a unitary end cap 46. The sleeve segments 43 each have a first side surface 48 and a second side surface 50. The elastomeric material 44 is formed and bonded to adjacent side surfaces 48,50. The end cap 46 covers a portion of the first end portion 28 and includes an inner surface 52 and an extending portion 54. The extending portion 48 includes an abutment surface 56.

The first insert 28 has an enlarged shoulder portion 60 and a shaft 62 which extends axially into the bore 40 of the sleeve 26. The shoulder portion 60 has a counterbore 64. A stepped bore 66 extends axially from the counterbore 64 through the shaft 62. The larger diameter of the stepped bore is threaded 63 adjacent the counterbore 64. The threaded bore could be used to attach a bolt or puller to remove the insert from the sleeve bore. The outer diameter of the shaft 62 is a tapered surface 68 that conforms to the tapered surface 41 of the sleeve 26.

The second insert 30 has an enlarged shoulder 70 and a shaft 72 which extends axially into the bore 40 of the sleeve 26. The shoulder portion 70 has a counterbore 74. A bore 76 extends axially from the counterbore 74 through the shaft 72. The outer diameter of the shaft 72 is a tapered surface 78 that conforms to the tapered surface 42 of the sleeve 26.

The fastener 32 is shown as a bolt, however other fasteners could be used without departing from the invention. The fastener 32 has a thread rod portion 80 which is positioned within the bores 66,76 of the inserts. The threaded rod 80 has an enlarged head 82 positioned within the counterbore 64 of the first insert 28 for contact with the shoulder 60. A nut 84 is threadably connected to the threaded rod 80 and is positioned within the counterbore 74 of the second insert 30 for contact with the shoulder 70.

Industrial Applicability

In use of the present invention the expandable mounting pin arrangement 22 is used to connect the first and second structure 18,20 together. The structures 18,20 have mounting cavities of a predetermined diameter and the sleeve assembly can be positioned into the mounting holes of the structures. The sleeve assembly 24 could be pre-assembled but not expanded so that the diameter of the sleeve assembly is smaller than the diameter of the holes in the structures. To position the sleeve assembly 24 into the structure the second end portion of the sleeve is positioned within the structure and moved axially until the abutment surface 56 of the end cap 46 contacts the second structure 20. The end cap 46 contacting the structure will stop axial movement and provide a positive stop and will also provide a seal between the end cap 46 and the structure to prevent dirt from entering the mounting arrangement. After the sleeve is properly positioned within the structures the nut 84 is tightened onto the threaded rod 80. Tightening will pull the head 82 and the nut into contact with the respective insert 28,30. The inserts 28,30 will be moved axially toward each other and the interaction between the tapered surfaces 41,68, and 42,78 will move the sleeve segments 43 outwardly. The elastomeric material 44 between adjacent segments will stretch and allow adjacent segments to move outwardly but still maintain the sleeve 27 in one piece. The sleeve segments 43 will move outwardly until they contact the structures and fill the mounting arrangement to prevent dirt or other matter from entering the mounting arrangement 22.

To remove the sleeve assembly from the structure the fastener is first removed from the bores of the insert and a puller or bolt is threaded in the threaded bore of the first insert. After the bolt or puller is inserted in the insert any suitable structure can be used to pull on the bolt and attached insert to remove the insert from the sleeve. After the first insert is removed a punch could be used to drive out the second insert. After the inserts are removed the sleeve contract for easy removal.

In view of the forgoing, it is readily apparent that the structure of the present invention provides a mounting arrangement with a pin arrangement having a circular sleeve which can be expanded to seal the mounting arrangement to prevent dirt and other foreign matter from entering and damaging the mounting arrangement. The circular sleeve has adjacent arcuate segments that are formed and bonded together but still can be expanded in to prevent dirt from entering the mounting arrangement. The sleeve also includes an end cap which provides a seal between the sleeve and the structure to further prevent dirt from entering the mounting arrangement.

Other aspects, objects and advantages of this invention can be obtained from a study of the drawings, the disclosure and the appended claims.

What is claimed is:

1. A mounting pin arrangement adapted for attaching a first structure and a second structure together, the mounting pin arrangement, comprising:

a circular sleeve positionable within the first and second structure, the sleeve having a first end portion and, a second end portion and a bore extending axially therethrough, the sleeve includes a plurality of adjacent sleeve segments having an elastomeric material between and connected to adjacent segments and an elastomeric end cap on the first end portion, the sleeve segments being of a different material than said elastomeric material;

a first insert positionable within the bore of the first end portion of the sleeve, the first insert having a bore extending axially therethrough;

a second insert positionable within the bore of the second end portion of the sleeve, the second insert having a bore extending axially therethrough; and a fastener positionable within the bores of the first and second inserts to move the inserts axially toward each other within the bore of the sleeve assembly to expand the diameter of the circular sleeve assembly.

2. The mounting pin arrangement of claim 1, wherein an elastomeric material is molded and bonded between each adjacent sleeve segment and the end cap is integrally formed with the material between the adjacent segments.

3. The mounting pin arrangement of claim 2, wherein the end cap includes an extending portion which overlaps a portion of the first end portion of the sleeve assembly and includes a surface which contacts the first structure to stop axial movement of the sleeve assembly into the structure.

4. The mounting pin arrangement of claim 1, wherein the bore in the first and second end portions of the sleeve assembly is tapered from the end and converges toward the middle of the sleeve.

5. The mounting pin arrangement of claim 4, wherein the first insert includes a tapered portion which conforms to the taper in the first end portion of the sleeve assembly and further includes an enlarged shoulder portion having a counterbore.

6. The mounting pin arrangement of claim 1, wherein the bore in the first insert is a stepped bore and wherein the larger diameter is threaded.

7. The mounting pin arrangement of claim 6, wherein the second insert includes a tapered portion which conforms to the taper in the second end portion of the sleeve assembly and further includes an enlarged shoulder portion having a counterbore.

8. The mounting pin arrangement of claim 7, wherein the end cap is positioned between the first end portion of the sleeve assembly and the enlarged shoulder potion to seal the mounting structure.

9. The mounting pin arrangement of claim 8, wherein the end cap includes a surface which cleans the tapered surface of the first insert as the insert is positioned within the bore of the sleeve assembly.

10. The mounting pin arrangement of claim 9, wherein the fastener includes a threaded rod portion positioned in the bores of the inserts, a head portion positioned in the counterbore in the first insert, and a nut threadably connected to the threaded rod portion and being positioned within the counterbore of the second insert.

11. The mounting pin arrangement of claim 10 wherein the nut is threaded onto the threaded portion to pull the inserts toward each other to expand the diameter of the sleeve assembly.

12. A sleeve assembly; comprising;

a sleeve having a first end portion, a second end portion, a middle portion and a bore extending axially therethrough, the sleeve includes a plurality of arcuate sleeve segments molded and bonded together with an elastomeric material which includes an end cap positioned around a portion, the sleeve segments being of a different material than said elastomeric material of the first portion;

a pair of spaced inserts positionable within the bore of the sleeve, each of the inserts have a bore axially extending therethrough; and a fastener positionable within the bores of the inserts to move the inserts axially toward each other within the bore of the sleeve to expand the sleeve.

* * * * *

UNITED STATES PATENT AND TRADEMARK OFFICE
CERTIFICATE OF CORRECTION

PATENT NO.     : 6,629,808 B1
DATED          : October 7, 2003
INVENTOR(S)    : Kevin L. Martin et al.

It is certified that error appears in the above-identified patent and that said Letters Patent is hereby corrected as shown below:

<u>Drawings</u>,
Sheet 2, Fig. 2, the reference numeral 24 should be reference numeral 26.

Signed and Sealed this

Seventeenth Day of February, 2004

JON W. DUDAS
*Acting Director of the United States Patent and Trademark Office*